United States Patent [19]

Inata et al.

[11] Patent Number: 5,223,335
[45] Date of Patent: Jun. 29, 1993

[54] FIBER-REINFORCED COMPOSITE MATERIAL AND PROCESS FOR THE PRODUCTION THEREOF

[75] Inventors: Hiroo Inata; Shunichi Matsumura; Takashi Yoshitomi, all of Iwakuni, Japan

[73] Assignee: Teijin Limited, Osaka, Japan

[21] Appl. No.: 850,806

[22] Filed: Mar. 13, 1992

[30] Foreign Application Priority Data

Mar. 18, 1991 [JP] Japan .................. 3-077238
Nov. 8, 1991 [JP] Japan .................. 3-319660

[51] Int. Cl.$^5$ .............. B32B 7/00; D03D 3/00; B05D 3/02; C08G 69/08
[52] U.S. Cl. .................. 428/260; 428/272; 428/290; 428/273; 428/408; 528/317; 528/323; 528/331; 427/385.5
[58] Field of Search ............ 428/272, 260; 427/385.5; 528/317, 323, 331

[56] References Cited

U.S. PATENT DOCUMENTS

| Re. 30,371 | 8/1980 | Hedrick et al. | 528/312 |
|---|---|---|---|
| 3,922,254 | 11/1975 | Hedrick et al. | 528/312 |
| 3,965,075 | 6/1976 | Edwards | 528/312 |
| 4,857,603 | 8/1989 | Akkapeddi et al. | 525/437 |

FOREIGN PATENT DOCUMENTS

0377259 7/1990 European Pat. Off. .
2221478 10/1974 France .

*Primary Examiner*—George F. Lesmes
*Assistant Examiner*—Chris Raimund
*Attorney, Agent, or Firm*—Sherman and Shalloway

[57] ABSTRACT

A process for the production of a fiber-reinforced composite material, which comprises the steps of
(1) preparing a polymeric composition containing a substantially linear aromatic oligomer having a terminal aliphatic hydroxyl group, bis(acylcaprolactam) and a catalyst which promotes a ring opening-addition reaction of a hydroxyl group and a caprolactam ring,
(2) melting the polymeric composition and impregnating it into a fibrous reinforcing material to form a impregnated product, and
(3) heating the impregnated product up to a temperature sufficient to open the caprolactam ring while inhibiting elimination of caprolactam thereby to form, as a matrix resin, a thermoplastic copolymer having an ester group and an amide group in its main chain;

and a fiber-reinforced composition material produced by the above-mentioned process.

13 Claims, No Drawings

FIBER-REINFORCED COMPOSITE MATERIAL AND PROCESS FOR THE PRODUCTION THEREOF

DETAILED DESCRIPTION OF THE INVENTION

The present invention relates to a fiber-reinforced composite material and a process for the production thereof. More specifically, it relates to a fiber-reinforced composite material which comprises a specific thermoplastic resin as a matrix resin and is excellent in heat resistance, mechanical properties and moldability; and a process for the production thereof.

A fiber-reinforced composite material produced from a fibrous reinforcing material and a matrix resin has superior mechanical properties and is used as a structural part in a variety of fields and further, in sport and leisure commodities.

As composite material-applied materials have come into wide use in various fields in recent years, it is being desired to provide excellent materials having more functions than they have had so far. In a fiber-reinforced composite material, the kind of a fiber per se and a combination of the fiber with a resin as a matrix are important to produce the utmost properties of a fibrous reinforcing material or a reinforcing fiber. Thermosetting resins such as an epoxy resin are conventionally used as a matrix resin and are generally excellent in heat resistance. However, the defects with these thermosetting resins are that they are inferior in toughness and difficult to shape after prepared into a primary processed material and that they cannot be recycled unlike a thermoplastic resin, while composite materials containing thermoplastic resins as a matrix resin recently attracts attention and are studied since the thermoplastic resins have advantages with respect to toughness, moldability after prepared into a primary processed material and recycling capability. Since, however, thermoplastic resins have a higher melt viscosity than precursors of the thermosetting resin, they are poor, for example, in impregnating ability into a reinforcing fiber fabric, and voids are liable to form in a molded article.

U.S. Pat. No. 3,922,254 and its reissued Patent Re 30,371, and Japanese Patent Publication No. 32,334/1986 disclose a catalyzed imide-alcohol condensation process for the preparation of polymeric compounds of polyester-polyamide comprising: polymerizing alcohols having one or more hydroxyl groups attached to an aliphatic carbon, and acyl lactams having from 4 to 11 carbon atoms in each lactam ring in the presence of at least one of Group IA, IIA, IIB and IIIA metals or metal compounds to form said polymeric compounds of polyester-polyamide.

The above Patents and Publication disclose that the catalyzed imide-alcohol condensation reaction is typified by a reaction in which one caprolactam ring in a bis-caprolactam molecule is eliminated from acyl lactam, e.g., bis-caprolactam with an alcohol, e.g., a diol.

The above Patents and Publication also disclose that the polyester-polyamide obtained by the above condensation process can be modified with fillers, fibers, etc.

U.S. Pat. No. 3,965,075 discloses that the same imide-alcohol condensation reaction as that disclosed in the above U.S. Pat. No. 3,922,254, etc., can be carried out in the presence of a catalyst selected from at least one of tertiary amines and a Group IVA, IB, IVB, VB, VIB and VII organometal compound.

Japanese Laid-open Patent Application No. 227,567/1988 discloses a process for producing an acyl lactam functional substance which comprises reacting an acyl lactam compound with a polyol and/or polyamine having at least one hydroxyl group per molecule in the presence of titanic ester as a catalyst.

It is understood from the description of the above Laid-open Application, particularly its Examples, that the above acyl lactam functional substance is a compound formed from acyl lactam and polyol by eliminating half the lactam rings in acyl lactam molecules like the polyester-polyamide obtained by the reaction disclosed in the above U.S. Pat. No. 3,922,254, etc.

The above-formed acyl lactam functional substance is used as a reaction component together with a lactam, e.g., $\epsilon$-caprolactam for the production of a molded article of a nylon block copolymer.

Further, Japanese Laid-open Patent Application No. 277,659/1988 discloses a process for producing an acyl lactam functional substance by reacting the same raw materials as those described in the above Japanese Laid-open Patent Application No. 227,567/1988 in the presence of a five-membered or fused five-membered heterocyclic compound containing nitrogen.

It is clear from the description of its Example that the above acyl lactam functional substance is also a product formed from acyl lactam and polyol by eliminating half the lactam rings in acyl lactam molecules.

It is an object of the present invention to provide an industrially advantageous process for the production of a fiber-reinforced composite material.

It is another object of the present invention to provide a process for the production of a novel fiber-reinforced composite material, which uses, as a matrix resin, a thermoplastic resin prepared from a precursor having a relatively low viscosity as a starting material.

It is further another object of the present invention to provide a process for the production of a fiber-reinforced composite material excellent in heat resistance, mechanical properties and moldability.

It is still further another object of the present invention to provide a process for the production of a fiber-reinforced composite material which has excellent moldability after the primary processing and recycling capability.

It is yet another object of the present invention to provide a fiber-reinforced composite material prepared by the process of the present invention, and a shaped or molded article therefrom.

Other objects and advantages of the present invention will be apparent from the following description.

According to the present invention, the above objects and advantages of the present invention are achieved by a process for the production of a fiber-reinforced composite material, which comprises the steps of;

(1) preparing a polymeric composition containing a substantially linear aromatic oligomer having a terminal aliphatic hydroxyl group, bis(acylcaprolactam) and a catalyst which promotes a ring opening-addition reaction of a hydroxyl group and a caprolactam ring, (2) melting the polymeric composition and impregnating it into a fibrous reinforcing material to form a impregnated product, and (3) heating the impregnated product up to a temperature sufficient to open the caprolactam ring while inhibiting elimination of caprolactam thereby to form, as a matrix resin, a thermoplastic copolymer having an ester group and an amide group in its main chain.

In the process of the present invention, at first, the polymeric composition is prepared in the step (1).

The polymeric composition contains a substantially linear aromatic oligomer having a terminal aliphatic hydroxyl group, bis(acylcaprolactam) and a catalyst which promotes a ring opening-addition reaction of a hydroxyl group and a caprolactam ring.

The terminal aliphatic hydroxyl group in the aromatic oligomer includes hydroxyl alkyl groups such as hydroxy methyl and hydroxy ethyl.

The aromatic oligomer is required to be substantially linear. When it is highly branched, undesirably, a product is poor in mechanical properties, moldability after prepared into a primary processed material and recycling capability.

The aromatic oligomer has an aromatic main chain.

As a constituent of the aromatic main chain, preferred are aromatic polyethers and aromatic polyesters. Examples of the aromatic polyethers include polymers in which aromatic groups, preferably, phenylene or naphthylene units, are bonded through an ether group and polymers in which aromatic groups, preferably phenylene and naphthylene units, are bonded through ether group and any one of a sulfone, ketone, imide or sulfide group. Specific examples of the aromatic polyethers include polyarylene ether, polyether sulfone, polyether ketone and polyether imide.

Examples of the aromatic polyesters include polyesters formed from aromatic dicarboxylic acids as an acid component and aliphatic dihydroxy compounds as a diol component.

Examples of the aromatic dicarboxylic acids preferably include terephthalic acid, isophthalic acid, naphthalenedicarboxylic acid and diphenyldicarboxylic acid.

Examples of the aliphatic dihydroxy compounds preferably include aliphatic dihydroxy compounds such as ethylene glycol and neopentylene glycol; aliphatic dihydroxy compounds having an alicyclic group such as 1,4-cyclohexanedimethylol and tricyclodecanedimethylol; and aliphatic dihydroxyl compounds having an aromatic group such as 1,4-bis($\beta$-hydroxyethoxy)benzene, 2,2-bis($\beta$-hydroxyethoxyphenyl)propane, 1,1-bis($\beta$-hydroxyethoxyphenyl)cyclohexane, bis-[4-($\beta$-hydroxyethoxy)phenyl]sulfone and p-xylylene glycol.

In the present invention, the above aromatic polyethers and aromatic polyesters are preferably amorphous or difficulty crystallizable. The "amorphous or difficulty crystallizable" means that those polymers each of which constitutes a matrix in the step (3) to be detailed later are substantially not crystallized.

As an aromatic oligomer, advantageous are those which give a matrix resin having a secondary transition point (Tg) of preferably at least 50° C., more preferably at least 80° C., particularly preferably at least 100° C. at the step (3).

The flow temperature of the aromatic oligomer is preferably not more than 300° C., more preferably not more than 280° C., particularly preferably not more than 200° C.

Examples of the amorphous or difficulty crystallizable aromatic oligomer which exhibits a preferable secondary transition temperature and/or a preferable flow temperature include polyphenylene ethers and aromatic polyesters containing 50 to 90 mol % of an ethylene terephthalate unit or an ethylene-2,6-naphthalate unit.

Of these, more preferred are polyphenylene ethers since these have a high Tg.

In the present invention, aromatic oligomers having a terminal aliphatic hydroxyl group are used.

When the aromatic oligomer is a polyester, an aliphatic hydroxyl group can be easily introduced into the terminal(s) thereof. When it is a polyether, an aliphatic hydroxyl group can be also introduced into the terminal(s) thereof according to a variety of known chemical reactions.

For example, an aromatic oligomer having an aromatic polysulfone as a main chain and a hydroxyethyl group is produced by any one of the following methods (i) to (iii).

(i) A method in which dicyclodiphenylsulfone, a bisphenol and either a phenol having a hydroxyethyl group or an aromatic halide having both hydroxyethyl group and activated halogen are reacted.

(ii) A method in which dicyclodiphenylsulfone and an excess diphenol are reacted to form an oligomer having a terminal phenolic hydroxyl group, and then the oligomer is reacted, for example, with ethylene chlorohydrin.

(iii) A method in which polysulfone having a relatively high polymerization degree is decomposed to a polysulfone having a relatively low polymerization degree with an alkali, and then the latter polysulfone is reacted, for example, with ethylene chlorohydrin.

The above aromatic oligomer preferably has an inherent viscosity, measured in a phenol/tetrachloroethane (60/40 by weight) mixed solvent at 35° C., in the range of 0.05 to 0.45. The inherent viscosity is more preferably range of 0.01 to 0.4, particularly preferably in the range of 0.15 to 0.35.

The concentration of the terminal aliphatic hydroxyl group in the aromatic oligomer is preferably at least 30 eq/$10^6$ g, more preferably at least 50 eq/$10^6$ g, particularly preferably at least 100 eq/$10^6$ g.

The bis(acylcaprolactam) used in the present invention is preferably selected from the compounds of the following formula (I),

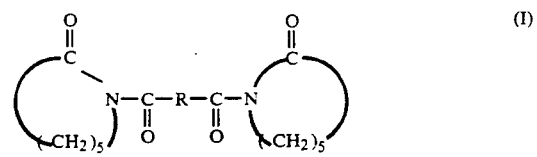

wherein R is an aromatic group having 6 to 16 carbon atoms, an aliphatic group having 2 to 10 carbon atoms or an alicyclic group having 6 to 12 carbon atoms.

In the formula (I), examples of the aromatic group having 6 to 16 carbon atoms preferably include m-phenylene, p-phenylene, tolylene, diphenylene, 1,5-naphthylene, 2,6-naphthylene and a group of the following formula.

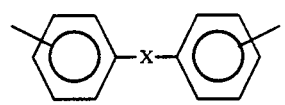

wherein X is —$CH_2$—, —O—, —S—, —$SO_2$—, —CO— or —$OCH_2CH_2O$—.

As the aliphatic group having 2 to 10 carbon atoms, preferred is, for example, a polymethylene group of the following formula, —(CH$_2$)$_n$— wherein n is an integer of 2 to 10.

As the alicyclic group having 6 to 12 carbon atoms, preferred is, for example, a 1,3- or 1,4-cyclohexylene group.

Of the above groups, particularly preferred are m-phenylene and p-phenylene.

As the bis(acylcaprolactam), preferred are terephthaloylbiscaprolactam and isophthaloylbiscaprolactam. These bis(acylcaprolactams) may be used alone or in combination.

The catalyst used in the present invention promotes a ring opening-addition reaction of the caprolactam ring of the bis(acylcaprolactam) and the terminal aliphatic hydroxyl group of the aromatic oligomer.

The above ring opening-addition reaction refer to a reaction of the following scheme.

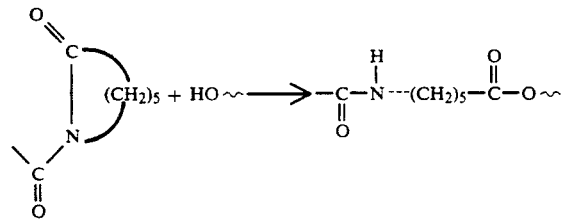

The above catalyst is preferably selected from trialkyl aluminum, trialkoxy aluminum and tetraalkoxy titanium. These catalysts may be used alone or in combination.

Examples of the trialkyl aluminum preferably include triethyl aluminum and tripropyl aluminum. Examples of the trialkoxy aluminum preferably include tributoxy aluminum and tripropoxy aluminum. Examples of the tetraalkoxy titanium preferably include tetrabutoxy titanium and tetrapropoxy titanium. Of these catalyst, tetraalkoxy titanium is particularly preferred.

The above catalyst can be formed in situ. For example, tetraalkoxy titanium is formed by reacting titanium tetrachloride with a compound having an aliphatic hydroxyl group in a system.

The polymeric composition of the present invention may optionally contain a viscosity adjuster in addition to the above aromatic oligomer, the bis(acylcaprolactam) and the catalyst.

Examples of the viscosity adjuster preferably include monomers having two aliphatic hydroxyl groups in the molecule such as an aliphatic dihydroxy compound having 2 to 20 carbon atoms and a polyol having at least three aliphatic hydroxyl groups in the molecule.

The aliphatic dihydroxy compound having 2 to 20 carbon atoms is selected from the same aliphatic dihydroxy compounds as those which have already described as the diol component when the aromatic oligomer is an aromatic polyester.

The above aliphatic dihydroxy compound is preferably used in an amount of not more than about 45 parts by weight per 100 parts by weight of the aromatic oligomer.

The above polyol is preferably selected, for example, from pentaerythriol, trimethylolpropane and glycerin.

The above polyol is preferably used in an amount of not more than about 5% by weight per 100 parts by weight of the aromatic oligomer.

In the above polymeric composition of the present invention, the amount of the bis(acylcaprolactam) is preferably 0.15 to 3 mol, more preferably 0.3 to 2.5 mol and particularly preferably 0.4 to 2 mol per equivalent of the total hydroxyl group of the aromatic oligomer having a terminal aliphatic hydroxyl group and the optionally used aliphatic hydroxyl compound having 2 to 20 carbon atoms and/or polyol.

The amount of the catalyst per 100 parts by weight of the aromatic oligomer is preferably 0.005 to 5 parts by weight, more preferably 0.01 to 0.5 part by weight.

The polymeric composition of the present invention can be prepared by mixing the above components together, i.e. by first mixing the aromatic oligomer with the catalyst and then admixing the bis(acylcaprolactam) with the resultant mixture, or by mixing the optional aliphatic dihydroxy compound having a 2 to 20 carbon atoms and/or the polyol with the catalyst and adding the aromatic oligomer, or mixing these hydroxyl compounds and the aromatic oligomer with the catalyst, and then admixing the bis(acylcaprolactam) with the resultant mixture.

The procedures are preferably carried out at a temperature in the range of 20° to 230° C., more preferably in the range of 20° to 210° C. The temperature is advantageously set at a temperature equivalent to or higher than the melting point of the aromatic oligomer used.

As described above, the polymeric composition is prepared in the step (1). The polymeric composition is particularly preferably in a state in which the above components are intimately mixed.

In the step (2) of the present invention, the above polymeric composition prepared in the step (1) is melted and impregnated into a fibrous reinforcing material to form an impregnated product.

The fibrous reinforcing material preferably has high strength, high modulus and heat modulus and heat resistance.

Examples of the fibrous reinforcing material include multifilaments, strands, mats, unwoven fabrics, woven fabrics, knitted fabrics, braids and unidirectionally arranged fiber sheets of carbon fibers, glass fibers, aramid fibers, silicon carbide fibers, aromatic polyester fibers, alumina fibers, titania fibers, boron nitride fibers, and the like.

The cross section of the above fibers may be not only circular but also non-circular such as trilobal and flat. It is preferred that the above fibers be surface-treated with silane or titanate to improve the adhesion to the matrix resin.

The fibrous reinforcing material may be contained in the impregnated product in an amount of preferably 10 to 80% by volume, more preferably 20 to 70% by volume.

The impregnation in the step (2) is preferably carried out while the polymeric composition has a melt viscosity of not more than 1,000 poise. Due to this, the impregnation of the polymeric composition into the fibrous reinforcing material can be carried out without causing any voids and intimately.

The impregnation can be carried out while the polymeric composition is in a molten state, e.g., at a temperature in the range of 200° to 300° C. The impregnation can be carried out, e.g., for 1 second to 10 minutes.

The impregnation may be carried out by a batch method or by a continuous method and under a reduced, atmospheric or elevated pressure.

Further, the impregnated product formed in the step (2) is heated in the step (3). The impregnated product may be heated in a place where it has been formed or in other place to which it has been moved to.

In the step (3), the impregnated product is heated up to a temperature sufficient to allow the bis(acylcaprolactam) to react. Differing from the impregnation in the step (2), the heating in the step (3) is carried out, while inhibiting elimination of caprolactam, thereby to form, as a matrix resin, a thermoplastic copolymer having an ester group and an amide group in its main chain. The above ester and amide groups refer to ester and amide groups formed by the ring opening-addition reaction which has been specified earlier.

The heating temperature in the step (3) is preferably not less than 200° C., more preferably in the range of 250° to 350° C., particularly preferably in the range of 260° and to 330° C.

The above step (3) is preferably carried out under an atmospheric pressure or under an elevated pressure in an inert gas atmosphere such as a nitrogen gas. The heating time is preferably in the range of seconds to 20 minutes, more preferably in the range of 1 to 10 minutes.

In the step (3), since the elimination of the caprolactam is inhibited, there is formed a thermoplastic copolymer which contains at least 1 equivalent weight, more preferably at least 1.2 equivalent weight, per mole of the bis(acylcaprolactam) introduced into the main chain, of the amide bond derived from the bis(acylcaprolactam) in the main chain.

The above thermoplastic copolymer having an ester group and an amide group in the main chain preferably has an inherent viscosity, measured in a phenol/tetrachloroethane (60/40 by weight) mixed solvent at 35° C., of at least 0.4.

In addition to the ring opening-addition reaction of the bis(acylcaprolactam) and the compound having the aliphatic hydroxyl group, there is known the following condensation reaction entailing elimination of the caprolactam.

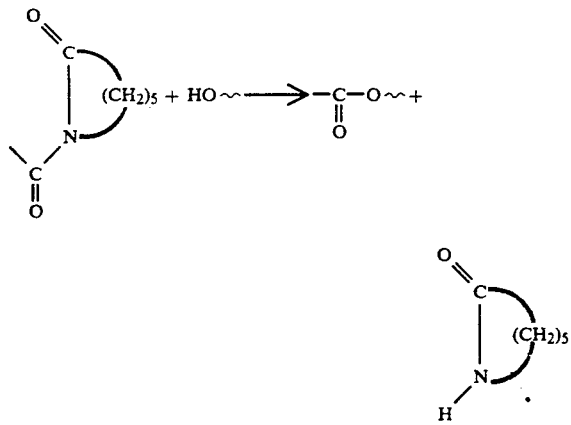

Further, it is known that the latter condensation reaction preferentially takes place.

The heating in the step (3) of the present invention has characteristic features in that the above condensation reaction entailing the elimination of the caprolactam is inhibited and hence, the former ring opening-addition reaction preferentially takes place.

When the condensation reaction preferentially takes place, the eliminated caprolactam undesirably causes gas voids in a shaped or molded article or generates vapor when a shaped or molded article is produced. The present invention is completely free from such disadvantages.

The heating in the step (3) of the present invention can be carried out on a shaped impregnated product as the impregnated product in the step (3). In this case, when the step (3) ends, a shaped article of the fiber-reinforced composite material is obtained.

Further, after the heating in the step (3) is carried out, the fiber-reinforced composite material obtained in the step (3) may be shaped or molded under an elevated, atmospheric or reduced pressure at an elevated temperature, i.e., at a temperature suitable for the shaping or molding, whereby a shaped or molded article of the fiber-reinforced composite material is obtained.

Preferred embodiments of the process of the present invention are as follows.

(1) An embodiment in which the fibrous reinforcing material is a flat article such as a mat, a woven fabric, a knitted fabric or an unwoven fabric:

The polymeric composition is prepared in the form of a sheet, and is laminated on the flat article while it is in a molten state. The resultant laminate is placed under an elevated pressure to form the impregnated product. The impregnated product is introduced into a heating zone to form a fiber-reinforced composite material having a thermoplastic copolymer as a matrix resin. Then, the fiber-reinforced composite material is shaped, e.g., by means of a cold press molding while it is in a softened state, whereby a molded article having a desired form is obtained.

(2) An embodiment in which the fibrous reinforcing is a linear article such as a multifilament or a strand:

The linear article is impregnated with the polymeric composition by a pull-trusion method to form a linear impregnated product. The linear impregnated product is introduced to a heating zone to form a fiber-reinforced composite material having a linear thermoplastic copolymer as a matrix resin, and the fiber-reinforced composite material is shaped, e.g., by a filament winding method, whereby a shaped article is obtained.

(3) In any one of the above embodiments, a film or a plate of other resin such as polycarbonate or a metal foil such as aluminum foil is incorporated during the shaping, whereby a shaped or molded article into which the film, plate or foil is integrated is obtained.

As described above, according to the present invention, there is provided the fiber-reinforced composite material of the present invention, and there is also provided a shaped or molded article of the composite material.

The above shaped article and the above molded or shaped article can be used as an article which is required to have heat resistance and excellent mechanical properties in a variety of industrial fields. The article includes automotive parts, machinery parts, structural materials, housings for household appliances, parabolic antennas, bags, upholstery materials, protection materials, sport goods, musical instrument parts, etc.

The present invention will be described further in detail by reference to Examples. In Examples, "part" stands for "part by weight", and the measurement for an inherent viscosity was carried out in a phenol/tetrachloroethane (60/40 by weight) mixed solution at 35° C. The measurement for a secondary transition point (Tg) was carried out by DSC at a temperature-elevation rate of 10° C./minute. The measurement of the terminal aliphatic hydroxyl group of a polymer for an equivalent was carried out according to the method described in Makromol. Chem., 26, 226 (1958).

REFERENTIAL EXAMPLE 1

Preparation of polysulfone oligomer having aliphatic hydroxyl group (1) A three-necked flask equipped with a stirrer and a Dean and Stark tube was charged with 760 parts of dimethylsulfoxide, 302 parts of toluene, 159 parts of 2,2-bis(4-hydroxyphenyl)propane (bisphenol A), 150 parts of 4,4'-dicyclodiphenylsulfone and 116 parts of anhydrous potassium carbonate. The mixture was kept at a temperature in the range of 130° to 145° C. for 4 hours while water was continuously removed as the toluene azeotrope. The reaction mixture was cooled, and after salts, the solvent and impurities were removed with a large amount of water and methanol, the resultant polymer was dried.

(2) A three-necked flask equipped with a stirrer was charged with 186 parts of the polymer obtained in the above (1), 100 parts of ethylene chlorohydrin, 172 parts of anhydrous potassium carbonate and 874 parts of dimethylsulfoxide.

The resultant mixture was kept at a temperature in the range of 90° to 105° C. The reaction mixture was cooled, and after salts, the solvent and impurities were removed with a large amount of water and methanol, the remainder was dried at 80° C. under vacuum.

The resultant product had an inherent viscosity of 0.18 and a terminal aliphatic hydroxyl group concentration of 760 eq/t.

REFERENTIAL EXAMPLES 2-4

Bisacylcaprolactam in an amount shown in Table 1 and 0.1 part of titanium tetrabutoxide were added to 100 parts by weight of the polysulfone having a terminal hydroxyl group, prepared in Referential Example 1, and the resultant mixture was heated in a nitrogen current at 280° C. for 5 minutes. Table 1 shows the inherent viscosity and Tg of the polymer obtained in each of these Referential Examples.

TABLE 1

| | Acylbiscaprolactam (amount: part) | Inherent viscosity | Tg (°C.) |
|---|---|---|---|
| REx.2 | Terephthaloylbiscaprolactam (15) | 0.52 | 119 |
| REx.3 | Terephthaloylbiscaprolactam (20) | 0.58 | 118 |
| REx.4 | Isophthaloylbiscaprolactam (20) | 0.38 | 114 |

REx = Referential Example

EXAMPLES 1-3

The polysulfone having a terminal hydroxyl group, prepared in Referential Example 1, bisacylcaprolactam and titanium tetrabutoxide, all in a powder form, were mixed in the same amounts as those described in Referential Examples 2 to 4 to prepare a composition (T). Then, the composition (T), polycarbonate films (P) and carbon filament plain weave fabrics (C) were laminated in the order of P-C-T-C-P, and the resultant laminate was pressed at 280° C. under a pressure of 20 kg/cm² for 5 minutes. In each of these Examples, the carbon filament plain weave fabrics were uniformly impregnated with the polymer, and no voids were observed. Table 2 shows the volume percentage (Vf) of the carbon filament plain weave fabric, i.e., a fibrous reinforcing material, in each laminate and the property of each of the pressed laminates.

TABLE 2

| | Composition | Vf (%) | Flexural modulus (kg/mm²) |
|---|---|---|---|
| Ex.1 | Same as Composition of REx.2 | 42 | 2,720 |
| Ex.2 | Same as Composition of REx.3 | 44 | 2,730 |
| Ex.3 | Same as Composition of REx.4 | 41 | 2,730 |

EXAMPLE 4

A polyether sulfone oligomer having a terminal hydroxyl group was prepared in the same manner as in Referential Example 1 except that the 2,2-bis(4-hydroxyphenyl)propane (bisphenol A) was replaced with 4,4'-dihydroxyphenylsulfone. The polyether sulfone oligomer had an inherent viscosity of 0.21 and a hydroxyl group concentration of 550 eq/t. 100 Parts of the polymer, 13 parts of terephthaloylbiscaprolactam and 0.1 part of titanium tetrabutoxide were uniformly mixed to prepare a composition. The composition, polycarbonate films and carbon filament plain weave fabric were laminated in the order of polycarbonate film-carbon filament plain weave fabric-composition-polycarbonate film, and the resultant laminate was pressed between two rotating rolls heated at 320° C. to give a laminated sheet. Then, the sheet was kept under heat at 280° C. for 5 minutes and press-formed on a concave mold to give a tough, concave shaped article of which the carbon filament plain weave fabric was uniformly impregnated with a polymer.

EXAMPLE 5

244 Parts of dimethyl 2,6-naphthalene dicarboxylate, 120 parts of ethylene glycol, 20 parts of neopentylene glycol and 0.1 part of titanium tetrabutoxide were allowed to undergo a condensation reaction by a customary manner to give a polymer having an inherent viscosity of 0.22. The polymer had a terminal hydroxyl group concentration of 330 eq/t. Then, 100 parts of the polymer was pulverized and dried, and 8 parts of terephthaloylbiscaprolactam was homogeneously mixed therewith. The resultant composition was used for the lamination at 270° C. under a pressure of 20 kg/cm² for 3 minutes in the same manner as in Examples 1 to 3 except that the carbon filament plain weave fabric was replaced with a glass filament plain weave fabric.

The glass filament plain weave fabric was uniformly impregnated with a polymer, which was almost a reaction product of the above composition and had an inherent viscosity of 0.65. Further, the thus-obtained laminate had a Vf of 29% and a flexural modulus of 1,310 kg/mm².

EXAMPLE 6

100 Parts of the same polyester as that used in Example 5, 8 parts of hexahydroterephthaloylbiscaprolactam and 0.15 part of titanium tetrabutoxide were mixed, and the mixture was melted at 180° C. and extruded to form a sheet having a thickness of about 100 μm. Then, the sheet and a carbon fiber plain weave fabric were laminated and treated in the same manner as in Example 4 to give a shaped article, of which the fabric was uniformly impregnated with a polymer. The polymer was taken out and measured for an inherent viscosity to show 0.52.

REFERENTIAL EXAMPLE 5

A three-necked flask equipped with a stirrer was charged with 66.0 parts of 4,4'-dichlorodiphenylsulfone, 61.5 parts of 2,2-bis(4-hydroxyphenyl)propane (bisphenol A), 25.0 parts of 2-(4-hydroxyphenyl)-2-(4-β-hydroxyethoxyphenyl)propane, 85.5 parts of potassium carbonate, 800 parts of dimethylsulfoxide and 500 parts of toluene, and the resultant mixture was allowed to react at a temperature in the range of 130° to 150° C. for 6 hours with stirring while water was removed out of the system azeotropically with toluene. The reaction product was cooled, and washed with methanol. Salts and the solvent were removed, and the remainder was dried. The thus-obtained polymer had an inherent viscosity of 0.17 and a terminal aliphatic hydroxyl group concentration of 243 eq/t.

EXAMPLE 7 AND COMPARATIVE EXAMPLE 1

100 Parts of the above-obtained polysulfone having a terminal hydroxyl group, 0.05 part of titanium tetrabutoxide and 7 parts of terephthaloyl biscaprolactam were mixed to prepare a composition, and the resultant composition and a carbon filament plain weave fabric were laminated. The laminate was pressed at 300° C. for 5 minutes under a pressure of 20 kg/cm². The fabric was uniformly impregnated with a polymer, and no voids were observed. The thus-obtained laminate was subjected to extraction with dimethyl acetamide to obtain the polymer, and the polymer was reprecipitated, washed, dried and measured for an inherent viscosity to show 0.56.

The above polymer was also analyzed by NMR to show that about 70% of the terephthaloylbiscaprolactam that reacted underwent a ring-opening reaction.

For comparison (Comparative Example 1), the above procedures were repeated except that the titanium tetrabutoxide was replaced with magnesium caprolactam. The inherent viscosity of the resultant polymer was as low as 0.32, and the ring-opening reaction ratio thereof determined by NMR analysis was also as low as about 20%. Further, many voids were observed in the press-formed laminate.

EXAMPLE 8

8 Parts of terephthaloylbiscaprolactam was mixed with 100 parts of the polymer having an inherent viscosity of 0.22, obtained in Example 5, and melted and extruded at 200° C. with a twin-screw extruder (residence time: about 5 minutes) to obtain a film. The film had an inherent viscosity of 0.23, or almost no improvement in the polymerization degree thereof was found. Then, said sheet and a carbon filament plain weave fabric were interposed between polycarbonate films and pressed between two rolls heated at 300° C. to give a laminate. Then, the laminate was kept under heat at 300° C. for 5 minutes, and press-formed with a mold to give a molded article. The polymer was extracted and measured for an inherent viscosity to show an improved inherent viscosity of 0.67.

As specified above, the matrix resin used in the fiber-reinforced composite material can be formed by a reaction for a very short period of time as compared with conventional thermoset matrix resins such as an epoxy resin. According to the present invention, therefore, the molding or shaping cycle can be shortened. The present invention has other advantages in that since the polymeric composition substantially does not contain a solvent, the polymeric composition can be obtained in a relatively low viscosity, and therefore, the treating thereof is very safe and easy. Further, the formed matrix resin has very high toughness as compared with conventional thermoset resins, and is a thermoplastic resin. Therefore, the moldability or shapeability after prepared into a primary processed material is excellent and can be recycled.

What is claimed is:

1. A process for the production of a fiber-reinforced composite material, which comprises the steps of:
   (1) preparing a polymeric composition containing a substantially linear aromatic oligomer having a terminal aliphatic hydroxyl group, bis(acylcaprolactam) and a catalyst which promotes a ring opening-addition reaction of a hydroxyl group and a caprolactam ring, said catalyst being tetraalkoxytitanium,
   (2) melting the polymeric composition and impregnating it into a fibrous reinforcing material to form an impregnated product, and
   (3) heating the impregnated product up to a temperature sufficient to open the caprolactam ring while inhibiting elimination of caprolactam thereby to form, as a matrix resin, a thermoplastic copolymer having an ester group and an amide group in its main chain.

2. The process of claim 1, wherein the aromatic oligomer is selected from the group consisting of aromatic polyethers and aromatic polyesters.

3. The process of claim 1, wherein the aromatic oligomer has an inherent viscosity in the range of 0.1 to 0.4, measured in a phenol/tetrachloroethane mixed solvent having a phenol/tetrachloroethane weight ratio of 60/40 at 35° C.

4. The process of claim 1, wherein the bis(acylcaprolactam) has the following formula,

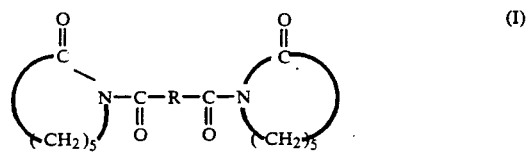

wherein R is an aromatic group having 6 to 16 carbon atoms, an aliphatic group having 2 to 10 carbon atoms or an alicyclic group having 6 to 12 carbon atoms.

5. The process of claim 1, wherein the bis(acylcaprolactam) is used in an amount of 0.15 to 3 mol per equivalent of the aliphatic hydroxyl group in the polymeric composition.

6. The process of claim 1, wherein the catalyst is used in an amount of 0.005 to 5 parts by weight per 100 parts by weight of the aromatic oligomer.

7. The process of claim 1, wherein the polymeric composition is impregnated into the fibrous reinforcing material while the polymeric composition has a melt viscosity of not more than 1,000 poises.

8. The process of claim 1, wherein an amide bond derived from the bis(acylcaprolactam) in the main chain of the thermoplastic copolymer as a matrix resin makes up at least 1 equivalent per mole of the bis(acylcaprolactam) taken into the main chain.

9. The process of claim 1, wherein the impregnated product is heated for 1 to 10 minutes.

10. The process of claim 1, wherein the step (3) is further followed by a step of shaping or molding the fiber-reinforced composite material obtained in the step (3) under an elevated, atmospheric or reduced pressure at an elevated temperature.

11. The process of claim 1, wherein the thermoplastic copolymer having an ester group and an amide group has an inherent viscosity of at least 0.4, measured in a phenol/tetrachloroethane mixed solvent having a phenol/tetrachloroethane weight ratio of 60/40 at 35° C.

12. A fiber-reinforced composite material obtained by the process recited in claim 1.

13. A shaped or molded article comprising the fiber-reinforced composite material recited in claim 12.

* * * * *